United States Patent [19]

Sugimura

[11] Patent Number: 5,767,936
[45] Date of Patent: Jun. 16, 1998

[54] LIQUID CRYSTAL IMAGE DISPLAYING/READING APPARATUS HAVING AN L SHAPE IMAGE READING ELEMENT IN A GAP BETWEEN DISPLAY PIXELS

[75] Inventor: Toshihiko Sugimura, Yamatokoriyama, Japan

[73] Assignee: Sharp Kabushiki Kaisha, Osaka, Japan

[21] Appl. No.: 767,582

[22] Filed: Dec. 16, 1996

[30] Foreign Application Priority Data

Dec. 14, 1995 [JP] Japan ................................ 7-325532

[51] Int. Cl.[6] ............................ G02F 1/133; G02F 1/1343
[52] U.S. Cl. ...................................... 349/116; 349/143
[58] Field of Search ............................. 349/116, 42, 48, 349/143, 141; 345/175

[56] References Cited

U.S. PATENT DOCUMENTS

| 5,051,570 | 9/1991 | Tsujikawa et al. | 349/42 |
| 5,446,564 | 8/1995 | Mawatari et al. | 349/116 |
| 5,677,744 | 10/1997 | Yoneda et al. | 349/48 |

FOREIGN PATENT DOCUMENTS

| 60-1646 | 4/1983 | Japan . | |
| 2-54591 | 8/1983 | Japan . | |
| 1-292320 | 11/1989 | Japan | 349/143 |
| 5-89230 | 4/1993 | Japan . | |
| 5-323275 | 12/1993 | Japan | 349/116 |

*Primary Examiner*—William L. Sikes
*Assistant Examiner*—Walter Malinowski
*Attorney, Agent, or Firm*—Nixon & Vanderhye P.C.

[57] ABSTRACT

A liquid crystal image displaying/reading apparatus includes a first transparent substrate; a second transparent substrate placed in parallel with the first transparent substrate with a fixed space therebetween; a set of display electrodes formed on the first transparent substrate and the second transparent substrate so that a plurality of display pixels arranged in a matrix with a prescribed gap therebetween are formed at the first transparent substrate; a plurality of light receiving elements formed between the first transparent substrate and the second transparent substrate at the position facing the gap for receiving light to convert the light into current; a reading device formed at the position facing the gap with the light receiving elements interposed for reading a signal received by the light receiving elements; and liquid crystal loaded between the first transparent substrate and the second transparent substrate, wherein the reading device includes a first transparent reading electrode formed on the side of the first transparent substrate with respect to the light receiving elements, and a second reading electrode formed on the side of the second transparent substrate with respect to the light receiving elements.

14 Claims, 17 Drawing Sheets

LIQUID CRYSTAL IMAGE DISPLAYING/READING APPARATUS HAVING AN L SHAPE IMAGE READING ELEMENT IN A GAP BETWEEN DISPLAY PIXELS

BACKGROUND OF THE INVENTION

1. Field of the Invention

The present invention relates to liquid crystal image displaying/reading apparatuses, and more particularly, to a liquid crystal image displaying/reading apparatus forming a plurality of display pixels arranged in a matrix with a prescribed gap therebetween.

2. Description of the Background Art

Information-related apparatuses for processing image information include an apparatus provided with both an image display for displaying image information and an image reading apparatus for reading the same. In such an information-related apparatus, an LCD (Liquid Crystal Display) with small power consumption and a CCD (Charge Coupled Device) or an image sensor using a photoelectric converting film are largely used as image display and image reading apparatus, respectively. In addition, an apparatus in which an image display and an image reading apparatus are integrally formed has been proposed in response to the demand for smaller apparatuses.

Japanese Patent Publication No. 60-1646 for example discloses a display and input apparatus with structure forming a light receiving element for detecting an input on a pixel-by-pixel basis. Referring to FIGS. 1 and 2, this display and input apparatus includes a panel 132 including a plurality of display units 131 arranged in a matrix in row and column directions by a required number of rows and columns for displaying and detecting characters or figures; a gate bus driver 109 connected through scanning electrodes 101 to prescribed display units 131 arranged in the row direction for selecting pixels on panel 132 in a prescribed order on a row-by-row basis; a column driver 110 for display connected through signal electrodes 102 for display to prescribed display units 131 arranged in the column direction for applying a voltage for driving a pixel on panel 132; and a detection driver 111 and a detecting circuit 112 connected through signal electrodes 103 for detection to prescribed display units 131 arranged in the column direction for detecting characters or the like input onto panel 132 on a pixel-by-pixel basis.

Each display unit 131 includes a transparent electrode 105 for display provided corresponding to signal electrode 102 connected to column driver 110, and receiving a signal corresponding to display/non-display on a pixel-by-pixel basis; an MOS (Metal Oxide Semiconductor) transistor 104 having its gate opened by application of a signal to scanning electrode 101 for the purpose of display; a liquid crystal cell 106 operated by a signal applied to signal electrode 102 and transparent electrode 105; a storing capacitor 107 for holding a voltage across liquid crystal cell 106 to achieve a memory function for each pixel; and a photosensitive transistor 108 for sensing incident light 113.

Next, display operation of the display and input apparatus will be described. When a signal is applied from gate bus driver 109 to one scanning electrode 101, the gates of MOS transistors 104 in the row connected to that scanning electrode are opened. At the same time, signals or voltages corresponding to display/non-display on a pixel-by-pixel basis are applied to signal electrodes 102 formed in the column direction and transparent electrodes 105, whereby corresponding liquid crystal cells 106 operate. Characters or figures are displayed as collection of such pixels.

Next, detection operation will be described. A number of light sensing transistors 108 are arranged in an array on the panel. When a character is written on the panel surface with a finger or the like, incident light 113 onto light sensing transistor 108 under the finger is intercepted in accordance with the finger movement, and the light sensing transistor 108 is turned off. Since the thickness of the finger is larger than the size of a pixel, a plurality of photosensitive transistors 108 are turned off with the movement of the finger, and that state is transmitted through signal electrodes 103 to detecting circuit 112. An input position, that is, a character pattern can be known by detecting circuit 112.

According to the display and input apparatus structured as disclosed in the above-mentioned Japanese Patent Publication No. 60-1646, however, the relationship between the position of a display element formed of transparent electrode 105 and signal electrode 102 on the panel and the position of a light receiving element formed of photosensitive transistor 108 on the panel is not clearly shown. Therefore, light for display is intercepted by the light receiving elements depending on the position thereof, resulting in reduction in area of display pixels. Accordingly, the numerical aperture might be reduced to cause degradation in contrast of both display and read images.

SUMMARY OF THE INVENTION

It is an object of the present invention to provide a liquid crystal image displaying/reading apparatus capable of maintaining excellent contrast of both display and read images.

It is another object of the present invention to provide a liquid crystal image displaying/reading apparatus capable of assuring sufficient display area for display pixels and having an excellent numerical aperture.

It is a further object of the present invention to provide a liquid crystal image displaying/reading apparatus capable of assuring sufficient display area for display pixels, having an excellent numerical aperture, and also capable of reading an image with high contrast.

It is an additional object of the present invention to provide a liquid crystal image displaying/reading apparatus capable of preventing light from a light source for reading from being incident on light receiving elements.

According to the present invention, a liquid crystal image displaying/reading apparatus includes a first transparent substrate; a second transparent substrate arranged in parallel with the first transparent substrate with a fixed space therebetween; a set of display electrodes formed in both the first transparent substrate and the second transparent substrate so that a plurality of display pixels arranged in a matrix with a prescribed gap therebetween are formed at the first transparent substrate; a plurality of light receiving elements each provided between the first transparent substrate and the second transparent substrate at a position facing the gap for receiving light to convert the light into current; a reading device provided at a position facing the gap with the light receiving element interposed for reading a signal received by the light receiving element; and liquid crystal loaded between the first transparent substrate and the second transparent substrate. The reading device includes first transparent reading electrodes provided on the side of the first transparent substrate with respect to the light receiving elements, and second reading electrodes provided on the side of the second transparent substrate with respect to the light receiving elements.

When the liquid crystal image display/reading apparatus functions as an image display, light emitted from a light source placed on the side opposite to the first transparent substrate with respect to the second transparent substrate is transmitted through the second transparent substrate and the display electrodes. Light transmitted through the portion except at least the reading device out of the emitted light travels in the liquid crystal. A voltage is selectively applied to the liquid crystal sandwiched between the set of display electrodes at the position where the display electrodes face a display pixel, whereby an image is displayed on a plurality of display pixels at the first transparent substrate. Since the reading device is provided in the gap between pixels, light traveling through the pixel portion will not be intercepted by the reading device.

Accordingly, sufficient display area of the display pixels is assured, and a sufficiently high numerical aperture can be maintained at the display surface.

When the liquid crystal image displaying/reading apparatus functions as image reading apparatus, an image surface of the original to be read is attached to the first transparent substrate. Light from the image surface of the original is transmitted through the first transparent substrate, the first display electrodes, the first reading electrodes, and the liquid crystal to be incident on the light receiving elements. Charges in these light receiving elements are read with the reading device, whereby an image on the original can be read. Since the first reading electrodes are transparent, light to be incident from the side of the original on the light receiving elements will not be intercepted, achieving reading with high contrast.

Preferably, the second reading electrodes are opaque. When the light source is placed on the side opposite to the first transparent substrate with respect to the second transparent substrate and light from the light source is reflected at the image surface of the original for example, this light is intercepted only by the second reading electrodes. Therefore, a large amount of light can be radiated onto the image of the original. In addition, since light to be directly incident on the light receiving elements out of the light emitted from the light source are intercepted by the second opaque reading electrodes, the light emitted from the light source will not be directly incident on the light receiving elements. Therefore, the light receiving elements can receive only light reflected from the image of the original.

As a result, the liquid crystal displaying/reading apparatus capable of maintaining excellent contrast of both display image and read image.

Preferably, each display pixel of the liquid crystal image displaying/reading apparatus is rectangular, and each light receiving element has an approximate L-shape formed between a corresponding display pixel and two display pixels respectively adjacent to two orthogonal sides of the corresponding display pixel.

Each light receiving element having an approximate L-shape can be formed to cover the portion facing the gap. Therefore, light receiving area of the light receiving element can be made as much as possible within the gap. Consequently, the liquid crystal image displaying/reading apparatus capable of maintaining excellent contrast of the read image can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described in conjunction with the accompanying drawings.

First Embodiment

Figure 1:
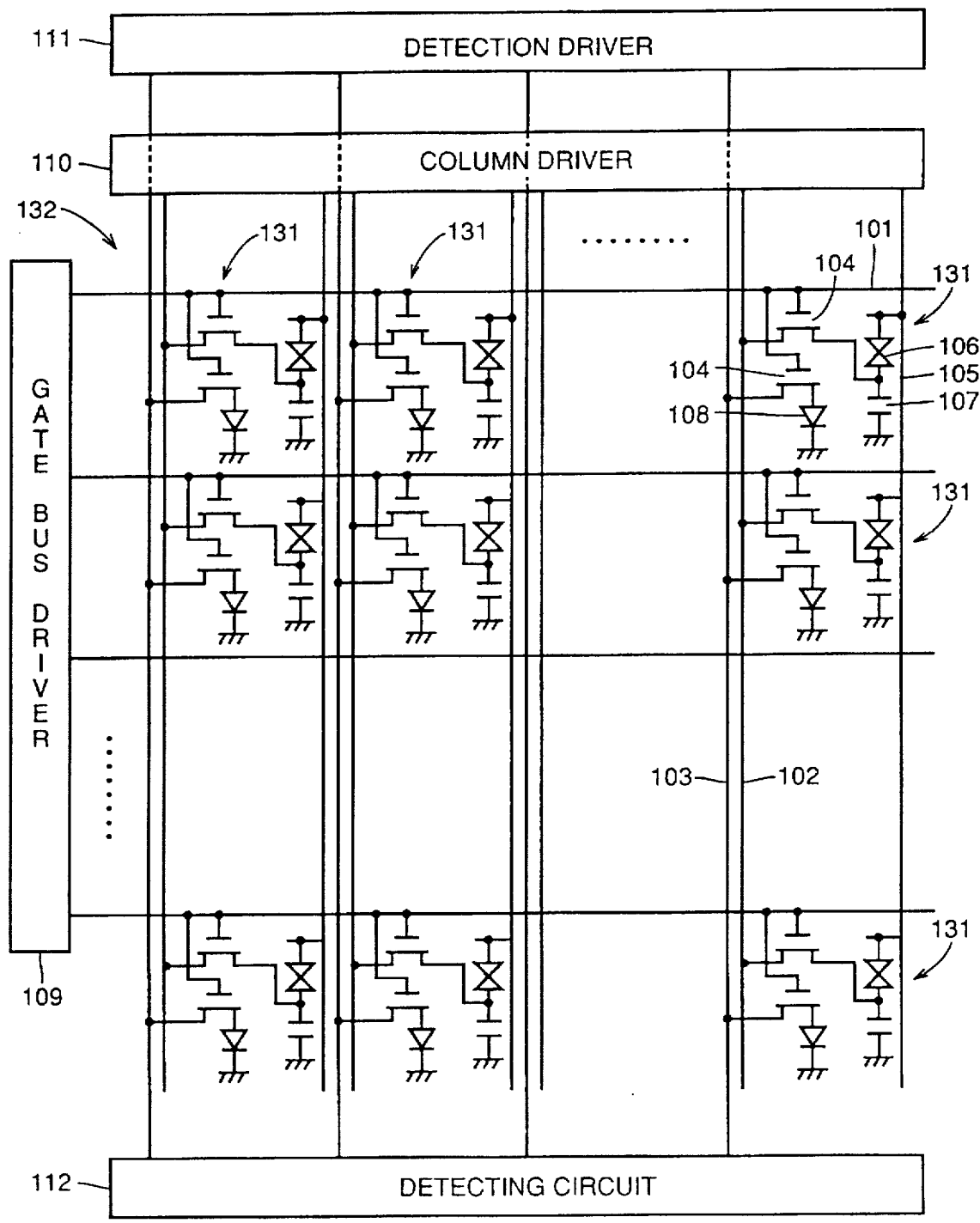
FIG. 1 is a diagram showing the whole structure of a conventional liquid crystal image displaying/reading apparatus.
Figure 2:
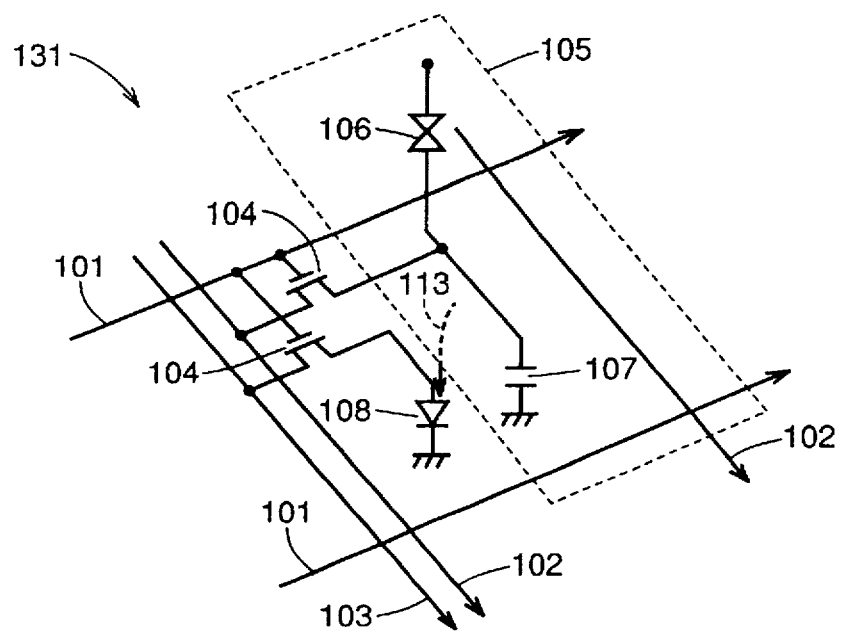
FIG. 2 is an equivalent circuit diagram of a display unit corresponding to a single pixel of the conventional liquid crystal image displaying/reading apparatus.
Figure 3:
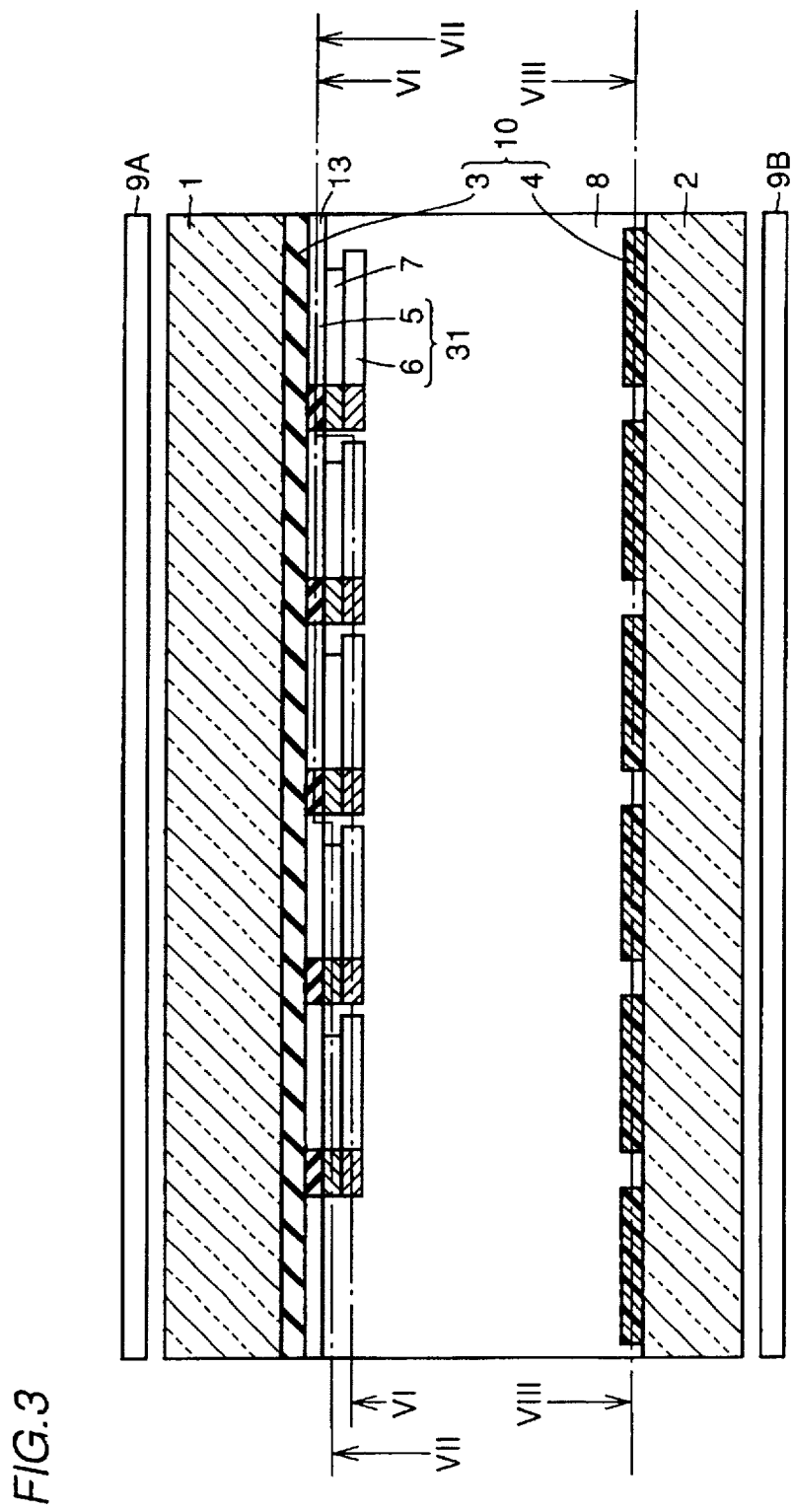
FIG. 3 is a cross sectional view showing a liquid crystal image displaying/reading apparatus from the thickness direction according to a first embodiment of the invention.
Figure 4:
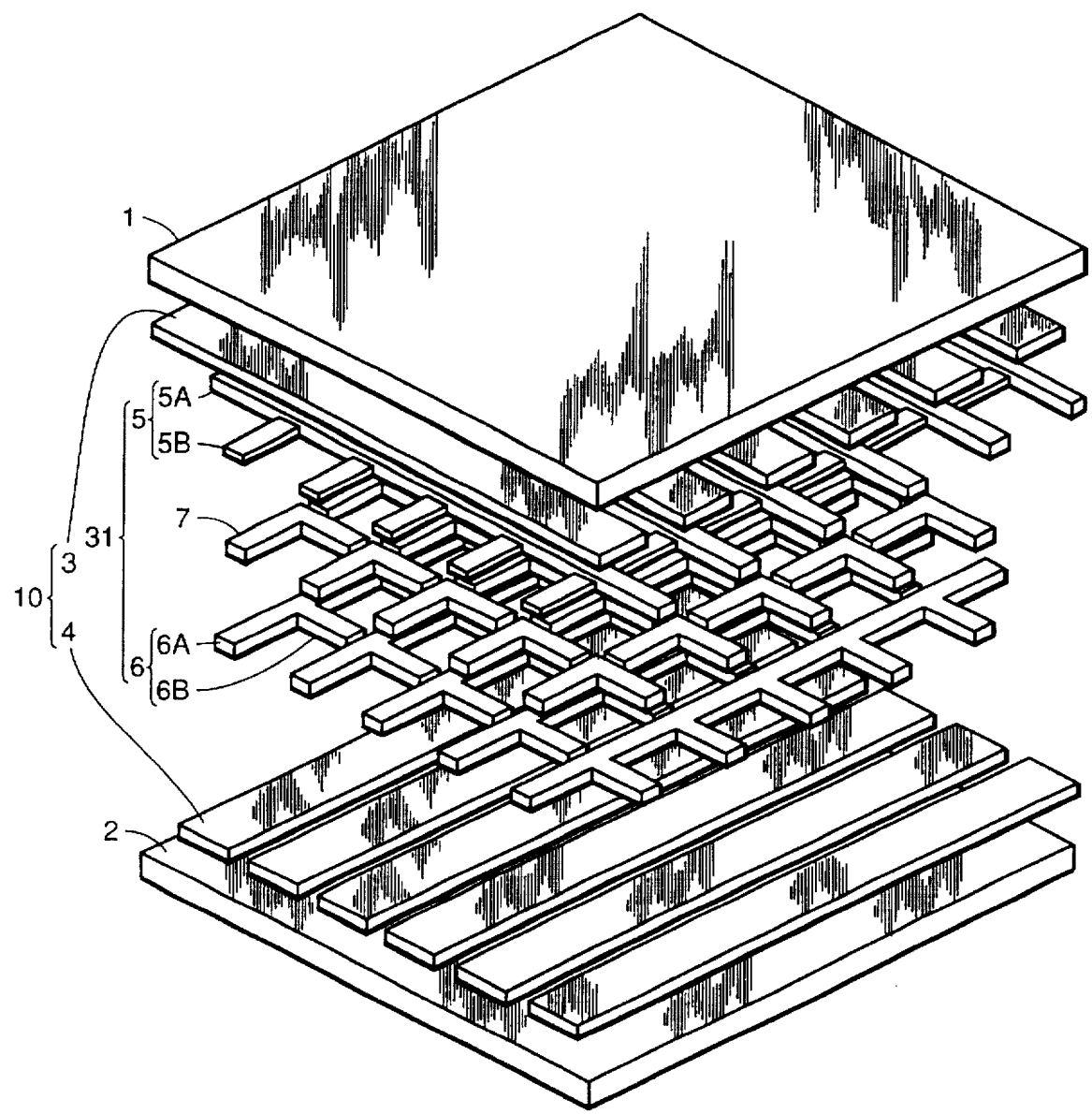
FIG. 4 is a perspective view showing how electrodes or the like are stacked according to the first embodiment.
Figure 5:
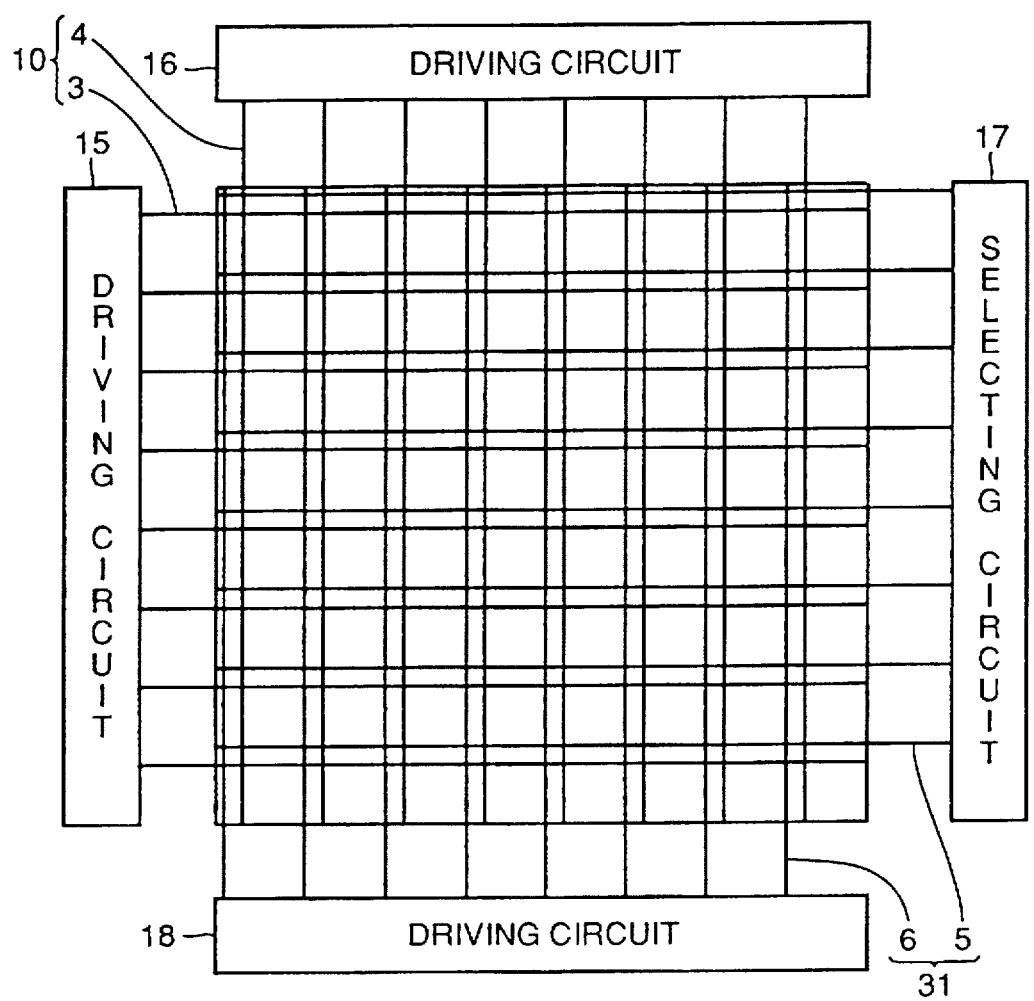
FIG. 5 is a diagram showing a connection state between the electrodes and each circuit.

According to the first embodiment, the present invention is applied to a liquid crystal image displaying/reading apparatus of a simple matrix driving method. Referring to FIGS. 3, 4, and 5, the liquid crystal image displaying/reading apparatus includes a first transparent substrate 1; a second transparent substrate 2 formed in parallel with first transparent substrate 1 with a prescribed space therebetween; a set of display electrodes 10 formed in first transparent substrate 1 and second transparent substrate 2 such that a plurality of display pixels arranged in a matrix with a prescribed gap therebetween are formed at first transparent substrate 1; a plurality of light receiving elements 7 each provided between first transparent substrate 1 and second transparent substrate 2 at the position facing the gap between the display pixels for receiving light to convert the light into current; a reading device 31 provided at a position facing the gap with light receiving elements 7 interposed for reading signals received by light receiving elements 7; liquid crystal 8 loaded between first transparent substrate 1 and second transparent substrate 2; and a pair of polarizing plates 9A and 9B respectively provided on outer sides of first transparent substrate 1 and second transparent substrate 2.

Reading device 31 includes transparent scanning electrodes 5 for reading (hereinafter simply referred to as scanning electrodes 5) provided on the side of first transparent substrate 1 with respect to light receiving elements 7, and opaque data electrodes 6 for reading (hereinafter simply referred to as data electrodes 6) provided on the side of second transparent substrate 2 with respect to light receiving elements 7.

The set of electrodes 10 for display include a plurality of scanning electrodes 3 for display (hereinafter simply referred to as scanning electrodes 3) formed on the inner surface of first transparent substrate 1, and a plurality of data electrodes 4 for display (hereinafter simply referred to as data electrodes 4) formed on the inner surface of second transparent substrate 2. The liquid crystal image displaying/reading apparatus further includes an insulating film 13 formed between scanning electrodes 3 and data electrodes 6 for electrically insulating scanning electrodes 3 from data electrodes 6.

Referring particularly to FIG. 5, the liquid crystal image displaying/reading apparatus further includes a driving circuit 15 connected to scanning electrodes 3, a driving circuit 16 connected to data electrodes 4, a selecting circuit 17 connected to scanning electrodes 5, and a driving circuit 18 connected to data electrodes 6.

Driving circuit 18 includes a shift register, a voltage amplifier, and a current/voltage converter, which are not shown. Selecting circuit 17 includes an analog switch including both a current/voltage converter and a voltage amplifier, which are not shown.

Referring to FIGS. 3 and 4, on the inner surface of first transparent substrate 1, the plurality of strip-shaped shaped scanning electrodes 3 for display are arranged with a fixed space therebetween ("gap") in one direction in the surface of first transparent substrate 1. The same number of corresponding scanning electrodes 5 as that of scanning electrodes 3 are formed in parallel with scanning electrodes 3 without contact therewith, wherein electrodes 5 correspond to respective electrodes 3. Scanning electrode 5 has a comb-shape constituted by a base portion 5A and a plurality of protruding portions 5B. The plurality of scanning electrodes 5 are located without contact with each other. In addition, approximately L-shaped light receiving elements 7 are formed overlapping scanning electrodes 5. The plurality of light receiving elements 7 are located without contact with each other. Finally, data electrodes 6 having a comb-shape constituted by a base portion 6A and a plurality of protruding portions 6B are formed in the direction perpendicular to that of scanning electrodes 3. Data electrodes 6 are formed overlapping light receiving elements 7, and a plurality of data electrodes 6 are located without contact with each other.

Meanwhile, on the inner surface of second transparent substrate 2, the plurality of strip-shaped data electrodes 4 for display are formed with a fixed space therebetween and in parallel with data electrodes 6. Data electrodes 4 for display and data electrodes 6 for reading are formed perpendicular to scanning electrodes 3 for display and scanning electrodes 5 for reading.

Figure 6:
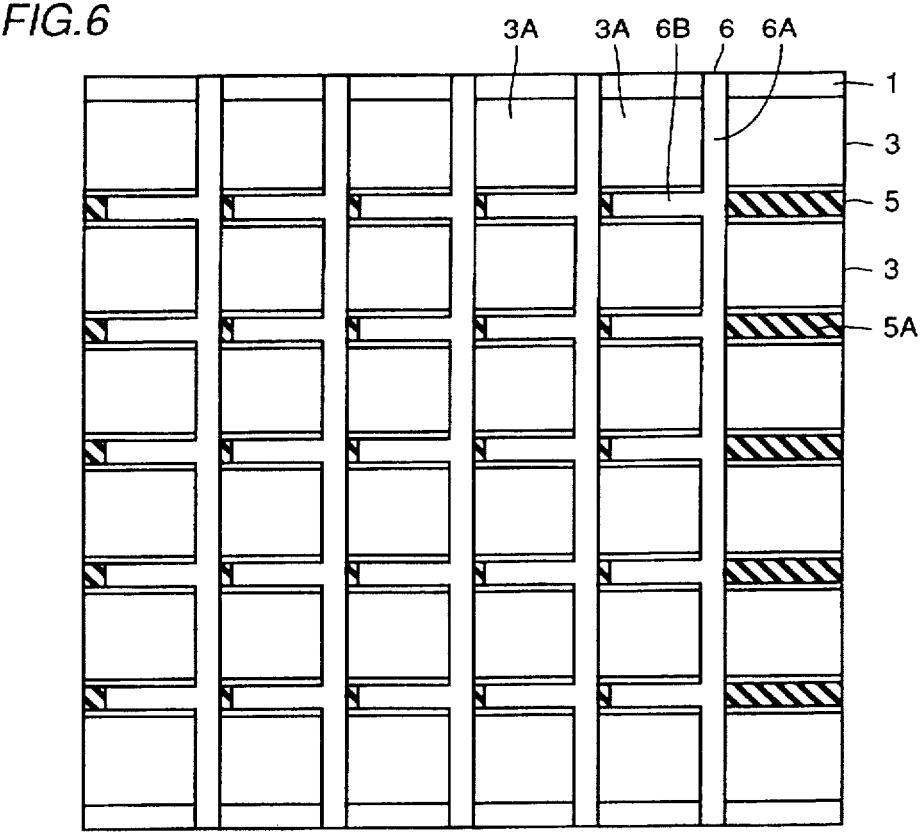
FIG. 6 is a cross sectional view showing a state in which a transparent substrate on the side of the display surface where the electrodes or the like are formed is viewed from the direction of the inner surface, according to the first embodiment.
Figure 7:
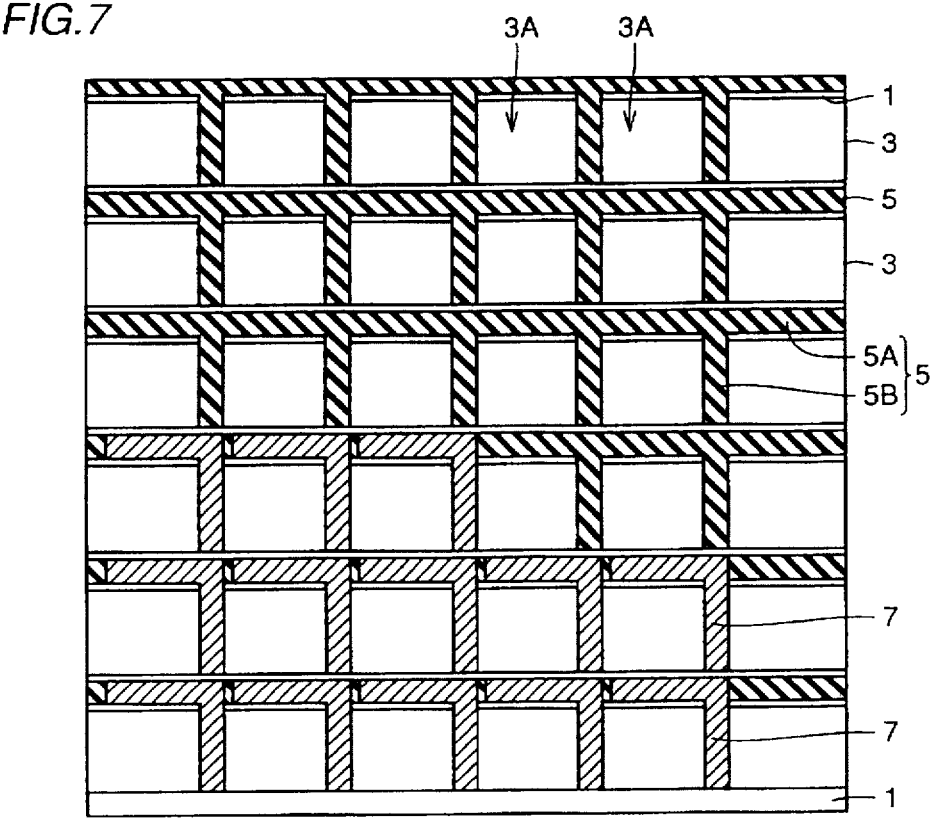
FIG. 7 is a cross sectional view showing a state in which the transparent substrate on the side of the display plane except data electrodes for reading is viewed from the direction of the inner surface, according to the first embodiment.

Referring to FIGS. 6 and 7, scanning electrode 3 is divided into a plurality of display pixels 3A by scanning electrode 5 and data electrode 6. The display surface of transparent substrate 1 is constituted by display pixels 3A being arranged in a matrix.

Base portion 5A of scanning electrode 5 and protruding portion 6B of data electrode 6 are located in the gap between adjacent scanning electrodes 3. Protruding portion 5B of scanning electrode 5 and base portion 6A of data electrode 6 are located at the portion where scanning electrode 3 is divided into the plurality of display pixels 3A. The respective widths of base portion 5A of scanning electrode 5 and protruding portion 6B of data electrode 6 are slightly smaller than the gap between adjacent scanning electrodes 3. As shown in FIG. 7, approximately L-shaped light receiving element 7 is formed at the position facing both protruding portion 5B of scanning electrode 5 and base portion 5A located between adjacent protruding portions 5B. The width of light receiving element 7 is approximately equal to that of base portion 5A and protruding portion 5B of scanning electrode 5.

Figure 8:
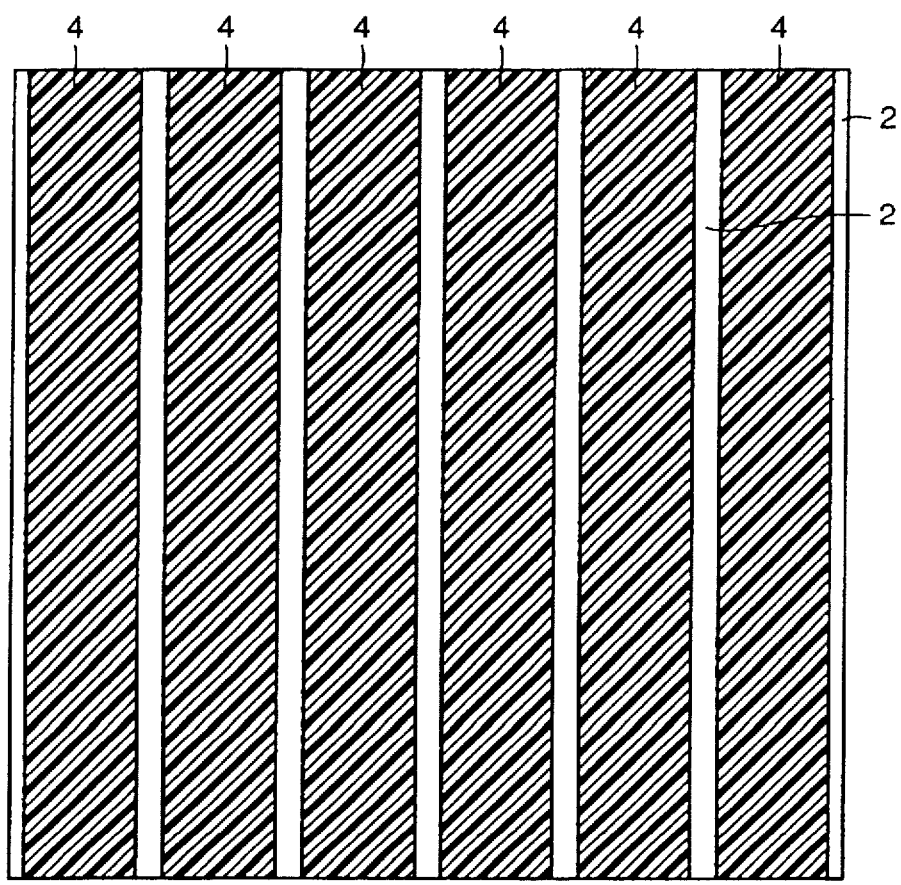
FIG. 8 is a cross sectional view showing a state in which the transparent substrate on the side of a light source where electrodes are formed is viewed from the direction of the inner surface, according to the first embodiment.

Referring to FIG. 8, on the inner surface of second transparent substrate 2, the plurality of strip-shaped data electrodes 4 for display are formed perpendicular to scanning electrodes 3. Scanning electrode 3 and data electrode 4 face each other with liquid crystal 8 therebetween in the range where display pixels 3A surrounded by the plurality of scanning electrodes 5 and the plurality of data electrodes 6 exist.

Figure 9:
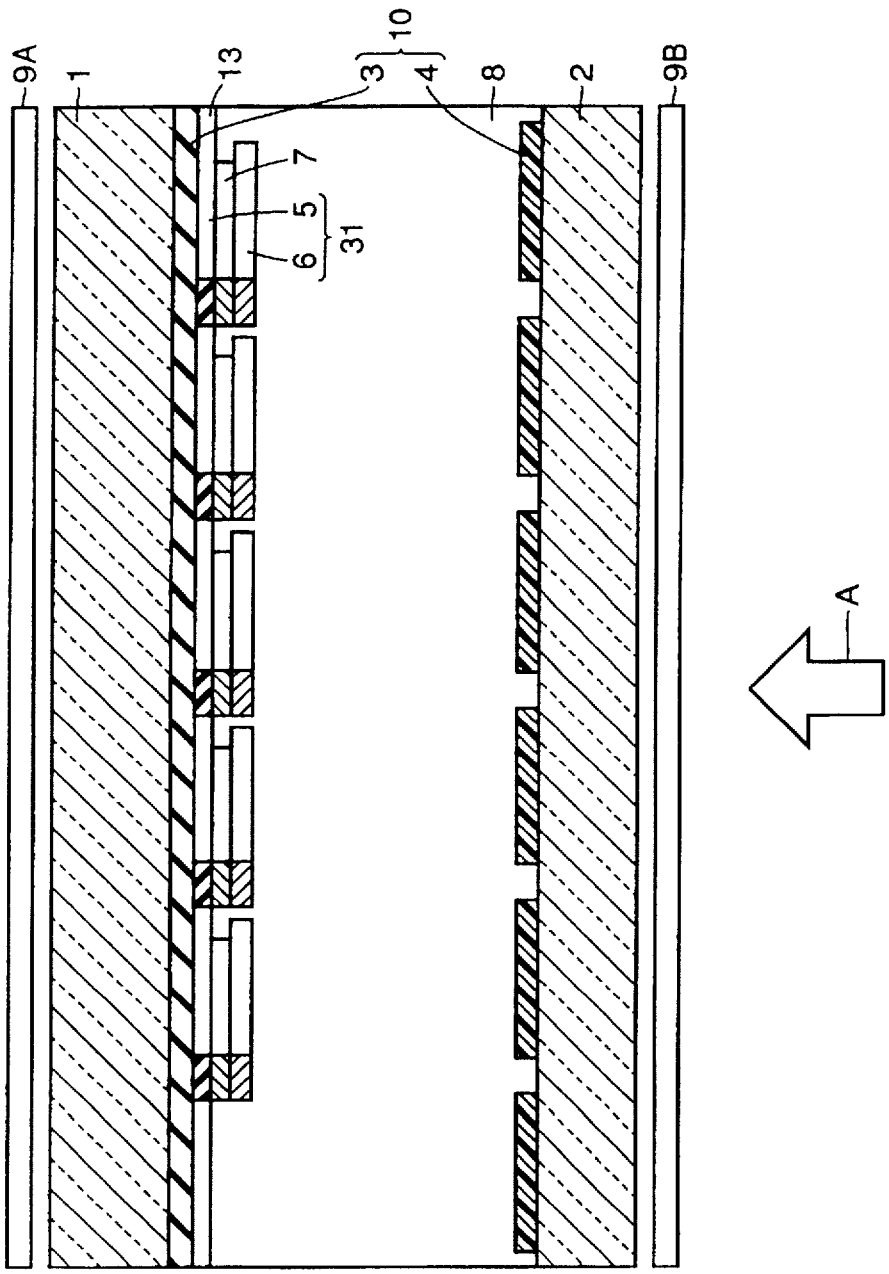
FIGS. 9, 10A, and 10B are diagrams for use in illustration of an operation method of the liquid crystal image displaying/reading apparatus according to the first embodiment.

Next, operation of the liquid crystal image displaying/reading apparatus of the simple matrix driving method will be described. Referring to FIGS. 9, 4 and 6, when the liquid crystal image displaying/reading apparatus operates as image display, back light A emitted from a light source placed on the side opposite to first transparent substrate 1 with respect to second transparent substrate 2 is transmitted through polarizing plate 9B, second transparent substrate 2, and data electrodes 4. Light transmitted through the portion except at least scanning electrodes 5 and data electrodes 6 out of the emitted light travels in liquid crystal 8 to first transparent substrate 1. A voltage is selectively applied to liquid crystal 8 sandwiched between scanning electrode 3 and data electrode 4 at the position where scanning electrode 3 and data electrode 4 face a display pixel, whereby a polarization plane of light forming each pixel is controlled and transmission/non-transmission of the light through polarizing plate 9A is determined, and therefore, an image is displayed on a plurality of display pixels at first transparent substrate 1. More specifically, driving circuit 15 for scanning electrodes 3 and driving circuit 16 for data electrodes 4 in FIG. 5 are controlled to selectively apply a voltage to liquid crystal 8 sandwiched between scanning electrode 3 and data electrode 4 in each display pixel 3A shown in FIGS. 6 and 7, whereby a liquid crystal image is displayed on the display surface of transparent substrate 1. Note that a white power source such as white fluorescent lamp coated with a white scatterplate can be used as light source.

Since scanning electrodes 5 and data electrodes 6 for reading are provided in the gap between the pixels, light traveling through the pixel portion will not be intercepted by scanning electrodes 5 or data electrodes 6. Therefore, sufficient display area of the display pixels is assured, and a sufficiently high numerical aperture at the display surface can be maintained. As a result, excellent contrast of the display pixels can be maintained.

Figure 10A:
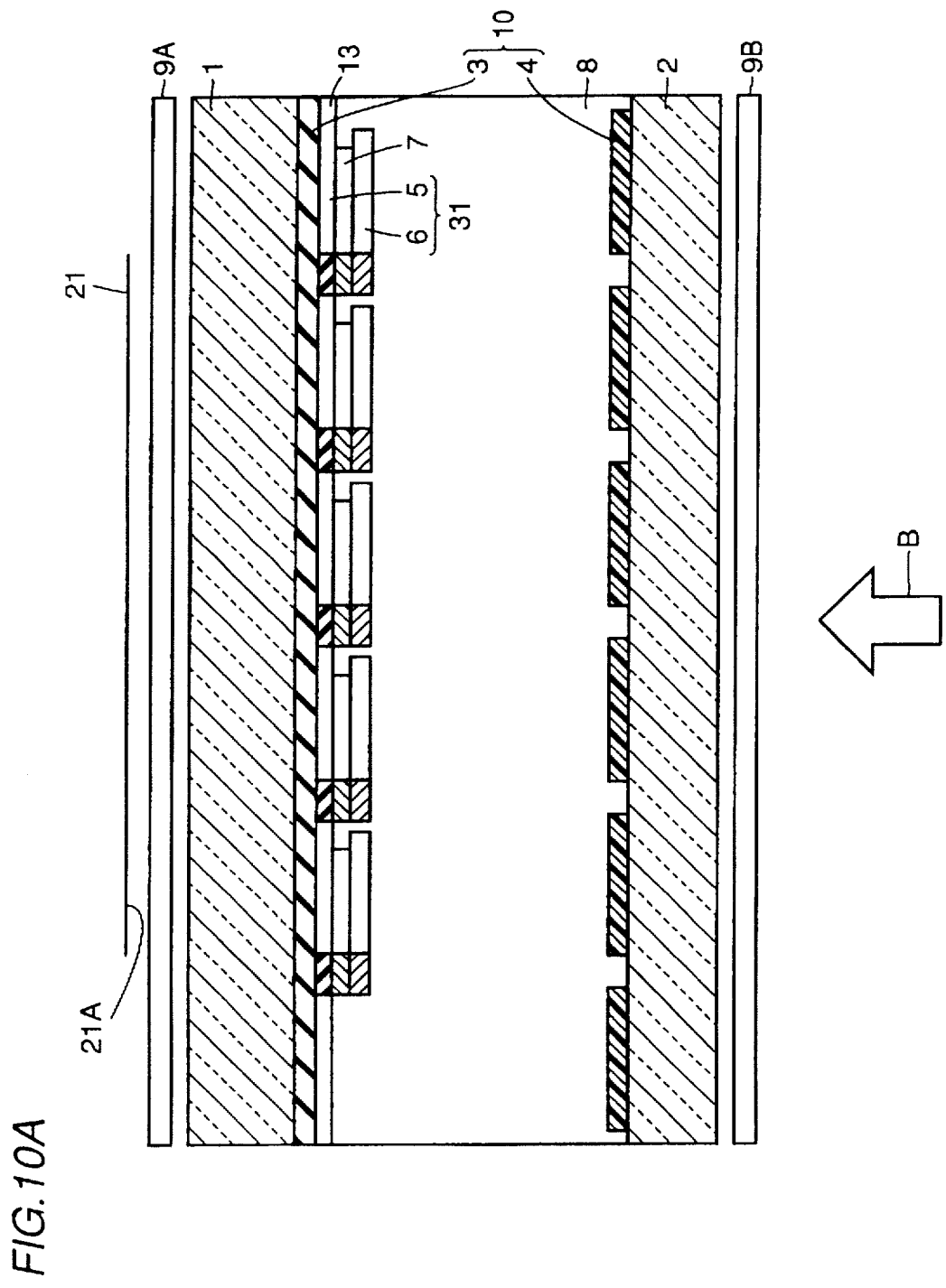

Referring to FIGS. 10A and 5, operation of the apparatus when the original 21 is reflective will now be described. At this time, the light source is placed on the side opposite to first transparent substrate 1 with respect to second transparent substrate 2, and back light B from the light source is reflected at an image surface 21A of original 21. Driving circuit 15 for scanning electrodes 3 and driving circuit 16 for data electrodes 4 are controlled to apply a voltage to liquid crystal 8 so that back light B is transmitted to the display surface of first transparent substrate 1 in all the display pixels 3A. Back light B transmitted to the display surface of transparent substrate 1 is reflected at image surface 21A of the original and transmitted through transparent scanning electrodes 5 to be incident on light receiving elements 7. In addition, driving circuit 18 is controlled and scanning electrodes 5 for reading the signal received by light receiving element 7 are selected in selecting circuit 17, whereby a received signal of light receiving element 7 at each display pixel 3A can be read according to an image density.

Back light B is intercepted only by opaque data electrodes 6. Therefore, a large amount of back light B can be radiated onto image surface 21A of original 21. In addition, light to be directly incident onto light receiving elements 7 out of the light B is intercepted by opaque data electrodes 6 and therefore back light B will not be directly incident onto light receiving elements 7. Therefore, the light receiving elements can receive only reflection light from the original image. As a result, excellent contrast of the read image can be maintained.

In addition, the data electrodes for reading are opaque and therefore light from the light source for reading can be prevented from being incident on the light receiving element. Furthermore, the numerical aperture is high and therefore a large amount of light can be used for reading. Accordingly, reading of the image also can be carried out with high contrast.

In addition, since the light receiving elements are made to have an L shape which achieves effective use of area in the gap between the display pixels, reflection light from the original can be received as much as possible as far as reduction in numerical aperture of the display pixels is prevented. Consequently, an image of the original can be read more accurately.

Furthermore, the electrodes for reading are made to have a comb-shape which achieves effective use of area in the gap between the display pixels, and therefore reflection light from the original can be received as much as possible as far as the numerical aperture of the display pixels is hardly reduced. Consequently, the image of the original can be read more accurately.

Figure 10B:
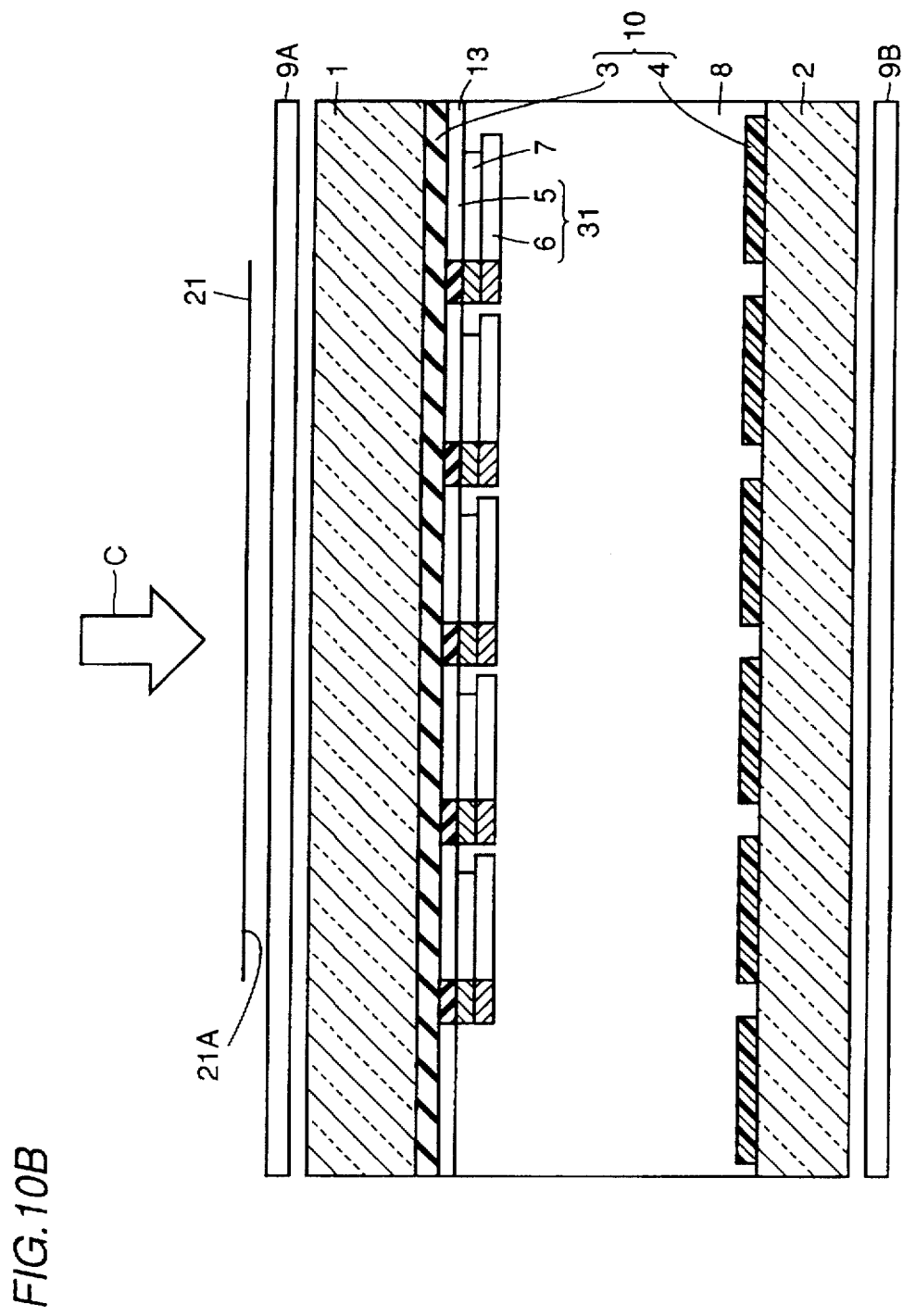

Referring to FIGS. 10B and 5, operation of the apparatus when the original 21 is transparent will now be described. When light source C emits light from the outside of first transparent substrate 1 onto the original 21 on transparent substrate 1, light from image surface 21A of original 21 is transmitted through first transparent substrate 1, scanning electrodes 3 for display, and scanning electrodes 5 for reading to be incident onto light receiving elements 7. Light receiving elements 7 store charges according to the amount of the received light. The charges in light receiving elements 7 are read with scanning electrodes 5 and data electrodes 6, whereby an image on original surface 21A can be read. Reading operation of the received signal of light receiving elements 7 is carried out on a row-by-row basis by switching the analog switch in selecting circuit 17. A received signal of light receiving element 7 for each pixel is extracted from driving circuit 18 through the current/voltage converter and the voltage amplifier by switching operation of the shift register in driving circuit 18 on a row-by-row basis.

Since scanning electrodes 5 for reading are transparent, light to be incident from the side of the original 21 onto light receiving elements 7 will not be intercepted, achieving reading with high contrast.

According to the liquid crystal image displaying/reading apparatus of the simple matrix driving method of the first embodiment as described above, the light receiving elements, the scanning electrodes and the data electrodes for reading an image can be located at the position facing the gap between the display pixels. Accordingly, sufficient display area for the display pixels can be assured, achieving a superior numerical aperture. Consequently, excellent contrast of the display image can be maintained.

Second Embodiment

According to the second embodiment, the present invention is applied to a liquid crystal image displaying/reading apparatus of an active matrix driving method.

The second embodiment will now be described with reference to the figures. In the figures, the same elements as those described in the first embodiment are denoted with the same reference numerals and characters. Detailed description thereof will not be repeated herein. In addition, FIG. 5 is common to the first embodiment.

Figure 11:
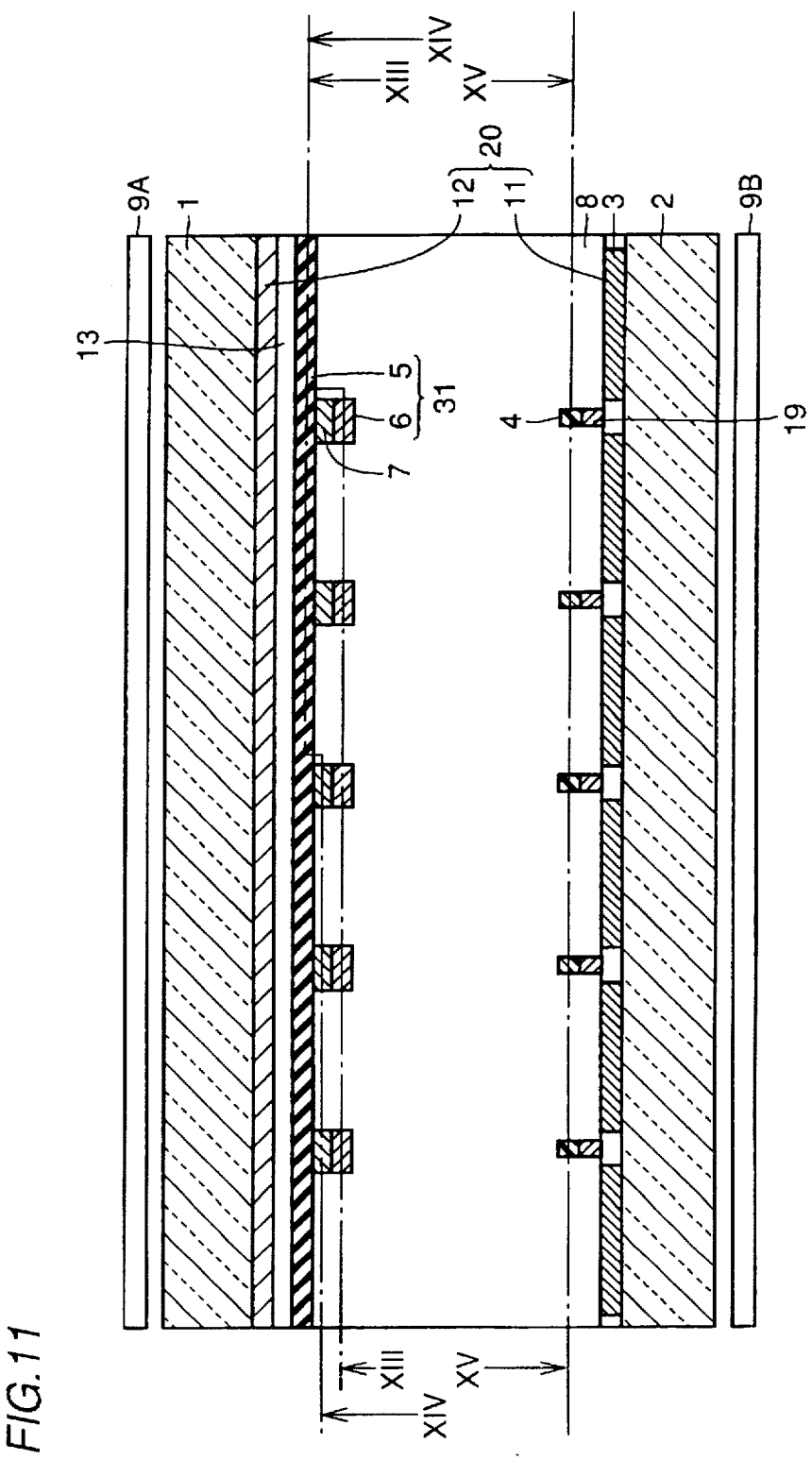
FIG. 11 is a cross sectional view showing a liquid crystal image displaying/reading apparatus from the thickness direction according to a second embodiment.
Figure 12:
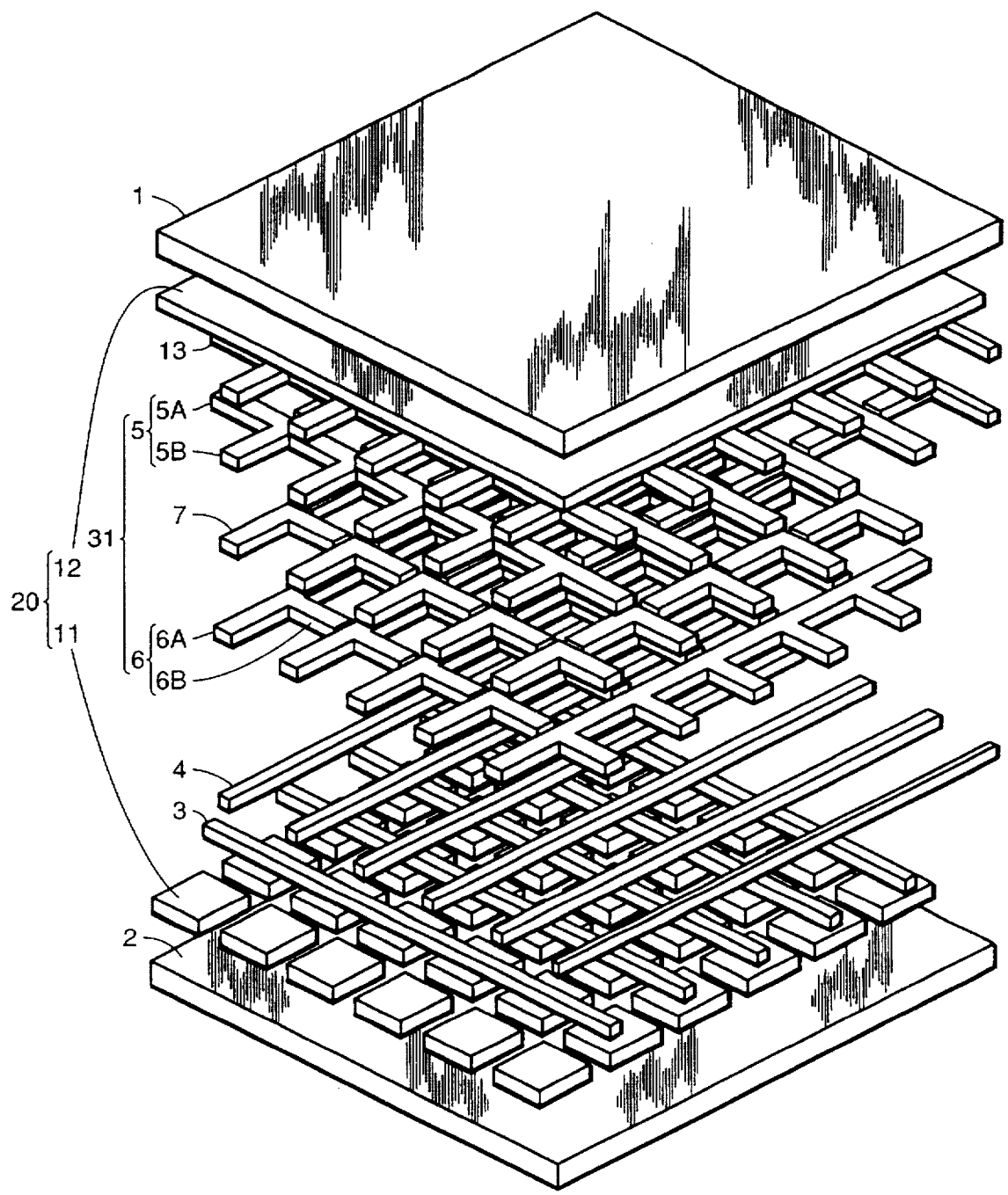
FIG. 12 is a perspective view showing how electrodes or the like are stacked according to the second embodiment.

Referring to FIGS. 11, 12, and 5, the liquid crystal image displaying/reading apparatus includes a first transparent substrate 1, a second transparent substrate 2, a set of display electrodes 20, a plurality of light receiving elements 7, a reading device 31, liquid crystal 8, polarizing plates 9A and 9B. Reading device 31 includes first transparent scanning electrodes 5 for reading (hereinafter simply referred to as scanning electrodes 5), and second data electrodes 6 for reading (hereinafter simply referred to as data electrodes 6).

The set of display electrodes 20 include a common electrode 12 for display (hereinafter simply referred to as common electrode 12) provided on the side of scanning electrode 5 of first transparent substrate I s o as to entirely cover a plurality of display pixels arranged in a matrix, and display pixel electrodes 11 arranged in a matrix at the position corresponding to each of the plurality of display pixels on the side of data electrodes 6 at second transparent substrate 2.

The liquid crystal image displaying/reading apparatus further includes scanning electrodes 3 for display and data electrodes 4 for display, which are provided in gaps between display pixel electrodes 11 and opposing data electrodes 6, an insulating film 19 for insulating scanning electrode 3 from data electrode 4, an insulating film 13 formed between common electrode 12 and scanning electrodes 5 for electrically insulating common electrode 12 from scanning electrodes 5, and TFTs (Thin Film Transistors) 14 (FIG. 15) formed at the position s corresponding to the intersections of data electrodes 4 and scanning electrodes 3 at pixel electrodes 11.

Scanning electrodes 3, data electrodes 4, scanning electrodes 5, and common electrode 12 are transparent electrodes formed of a material such as ITO. Data electrodes 6 are formed of a material such as Ni, and reflects light.

Referring to FIG. 12, transparent common electrode 12 for display is formed on the inner surface of first transparent substrate 1 to cover the whole surface of transparent substrate 1, and transparent insulating film 13 is further formed thereon. This insulating film 13 electrically insulates common electrode 12 from scanning electrodes 5, and is formed at the contact portion between common electrode 12, and scanning electrodes 5 and data electrodes 6. Then, scanning electrodes 5 for reading are formed.

Scanning electrode 5 has a comb-shape formed of a base portion 5A and a plurality of protruding portions 5B as in the first embodiment. A plurality of scanning electrodes 5 are located without contact with each other. Furthermore, light receiving elements 7 having an approximate L shape are formed overlapping scanning electrodes 5. The plurality of light receiving elements 7 are located without contact with each other. Finally, data electrodes 6 having a comb-shape formed of a base portion 6A and a plurality of protruding portions 6B are formed in the direction perpendicular to that of scanning electrodes 5 within the surface of transparent substrate 1. A plurality of data electrodes 6 for reading are located without contact with each other and overlaps light receiving elements 7.

Figure 15:
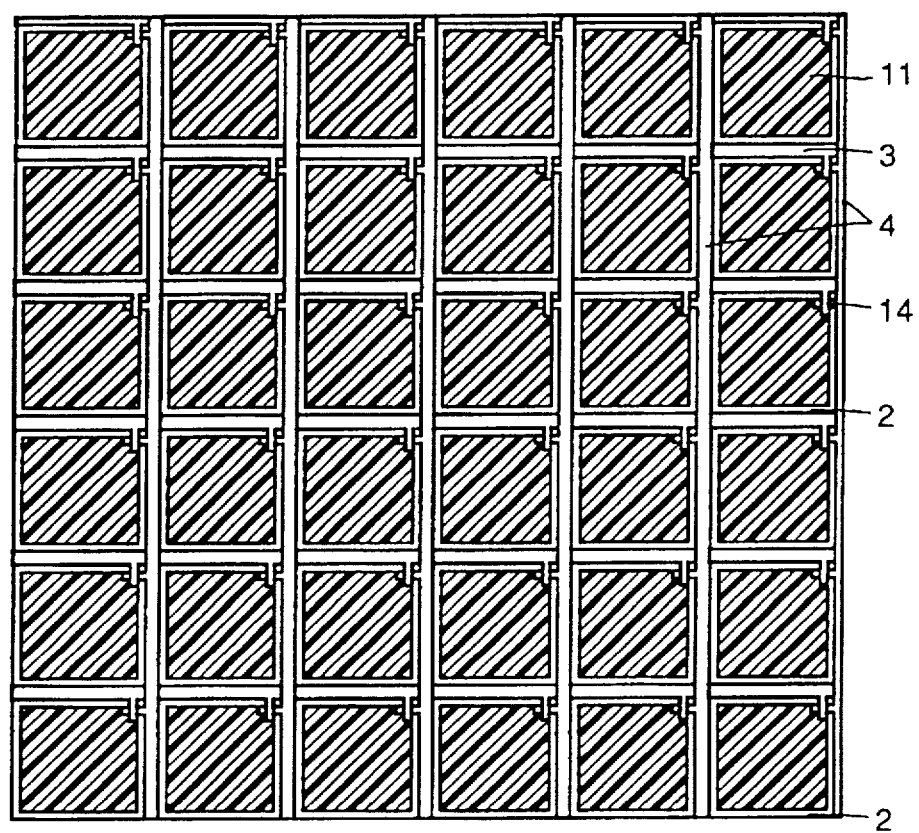
FIG. 15 is a cross sectional view showing a state in which the transparent substrate on the side of a light source where the electrodes are formed is viewed from the direction of the inner surface, according to the second embodiment.

Meanwhile, on the inner surface of transparent substrate 2, a plurality of rectangular display pixel electrodes 11 are formed in a matrix with a fixed gap therebetween. Strip-shaped scanning electrode 3 for display is formed in the gap in the row direction of the matrix formed of these display pixel electrodes 11, and data electrodes 4 for display are further formed in the gap in the column direction thereof with insulating film 19 interposed. Accordingly, scanning electrodes 3 are formed perpendicular to data electrodes 4. TFT 14 which will be described later in conjunction with FIG. 15 is formed at each intersection of scanning electrodes 3 and data electrodes 4. A voltage for display is applied to display pixel electrode 11 through TFT 14.

Figure 13:
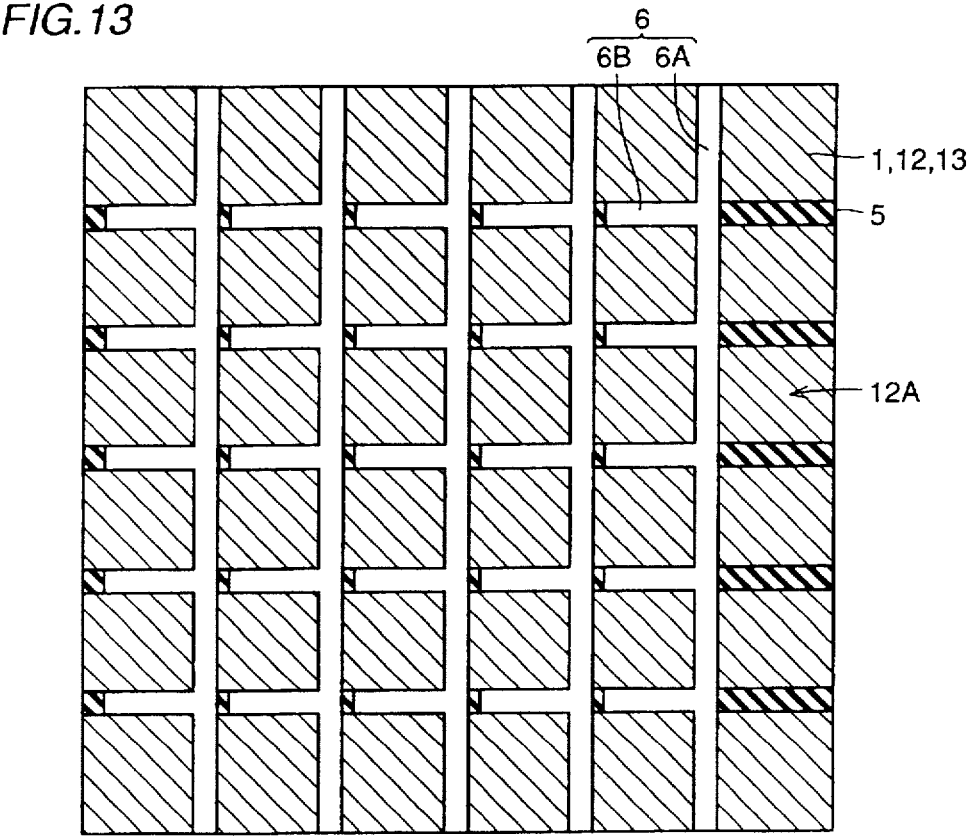
FIG. 13 is a cross sectional view showing a state in which a transparent substrate on the side of the display surface where the electrodes or the like are formed is viewed from the direction of the inner surface, according to the second embodiment.
Figure 14:
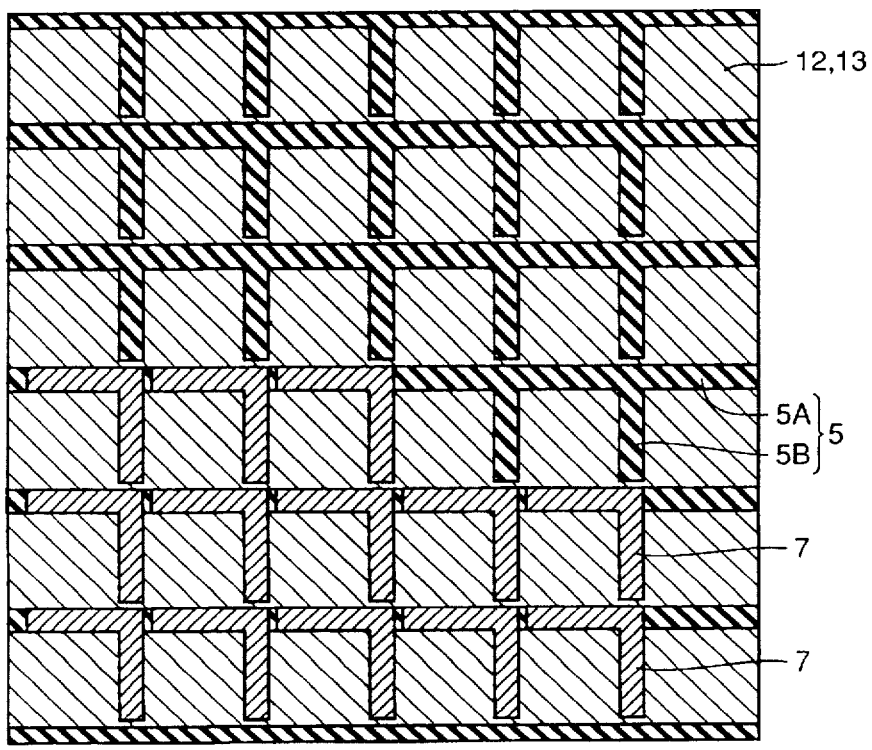
FIG. 14 is a cross sectional view showing a state in which the transparent substrate on the side of the display surface except data electrodes for reading is viewed from the direction of the inner surface, according to the second embodiment.

Referring to FIGS. 13 and 14, common electrode 12 for display is divided into a plurality of display pixels 12A by scanning electrode 5 and data electrode 6. The display surface of first transparent substrate 1 is structured with these display pixels 12A arranged in a matrix. In addition, as shown in FIG. 14, L-shaped light receiving elements 7 are formed at the positions facing protruding portions 5B of scanning electrodes 5 and base portion 5A located between adjacent protruding portions 5B as well as facing protruding portions 6B of data electrodes 6 and base portion 6A between adjacent protruding portions 6B. The respective widths of light receiving elements 7, scanning electrodes 5, and data electrodes 6 are approximately equal to each other.

Referring to FIG. 15, each display pixel electrode 11 formed in a matrix on the inner surface of second transparent substrate 2 has TFT 14 formed at each intersection of scanning electrode 3 and data electrode 4. Each display pixel electrode 11 is formed at the position facing corresponding display pixel 12A of first transparent substrate 1 with liquid crystal 8 therebetween.

Figure 16:
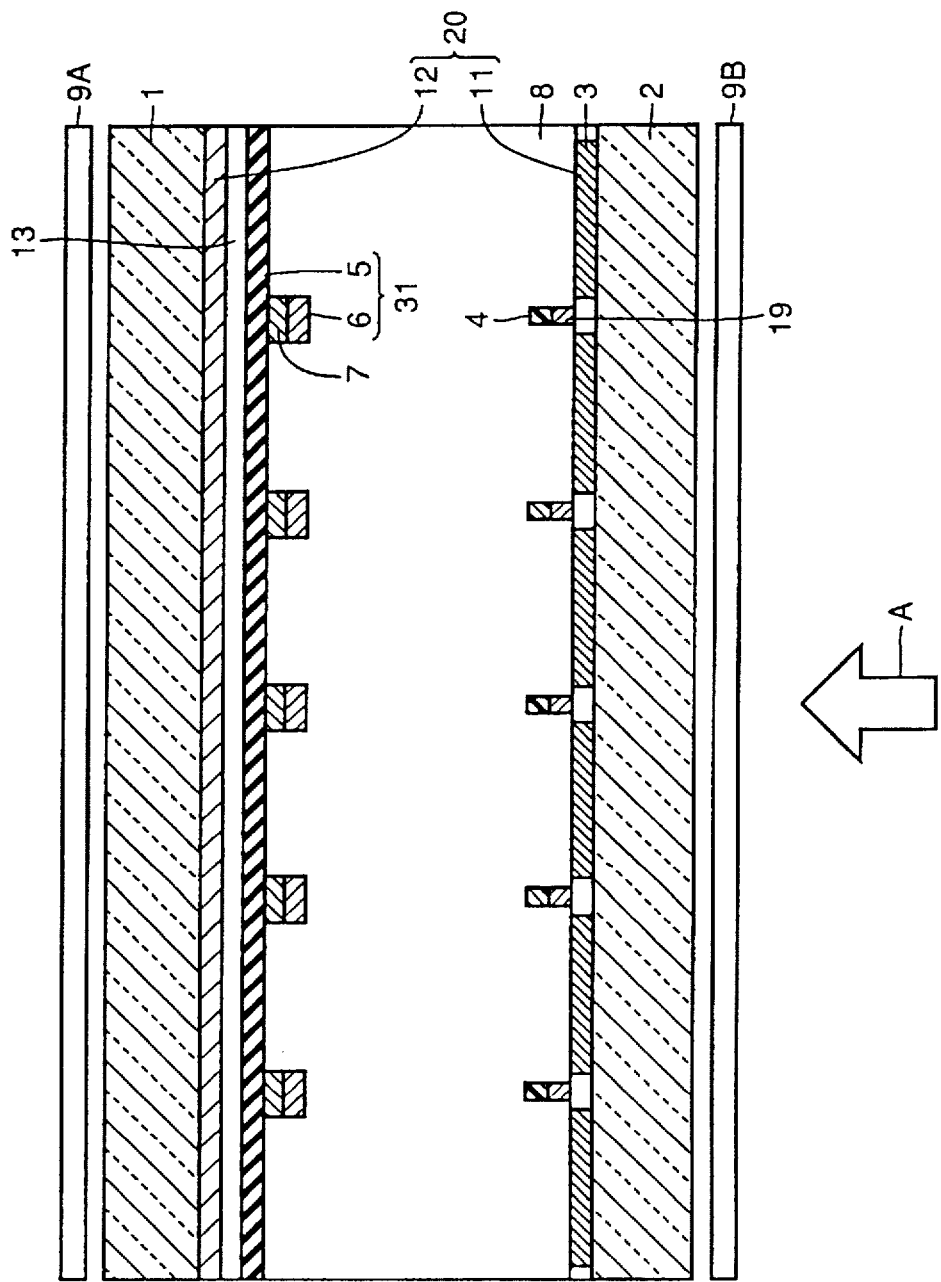
FIGS. 16, 17A, and 17B are diagrams for use in illustration of an operation method of the liquid crystal image displaying/reading apparatus according to the second embodiment.

Next, operation of the liquid crystal image displaying/reading apparatus of the active matrix driving method will be described. Referring to FIG. 16, when the liquid crystal image displaying/reading apparatus of the active matrix driving method operates as image display, back light A emitted from a light source located on the side opposite to first transparent substrate 1 with respect to second transparent substrate 2 is transmitted through polarizing plate 9B, second transparent substrate 2, display pixel electrodes 11, scanning electrodes 3 for display, insulating film 19, and data electrodes 4 for display. Light transmitted through the portion except at least scanning electrodes 5 and data electrodes 6 out of the emitted light travels in liquid crystal 8 through scanning electrodes 5, insulating film 13, and common electrode 12 to first transparent substrate 1. A voltage is selectively applied to liquid crystal 8 sandwiched between display pixel electrode 11 and common electrode 12 and opposing a display pixel by scanning electrode 3 and data electrode 4, whereby an image is displayed on a plurality of display pixels at first transparent substrate 1.

More specifically, driving circuit 15 for scanning electrodes 3 and driving circuit 16 for data electrodes 4 shown in FIG. 5 are controlled to turn on TFTs 14 located at the intersections of scanning electrodes 3 and data electrodes 4, whereby a voltage is selectively applied to liquid crystal 8 sandwiched between display pixel electrode 11 and common electrode 12 in each display pixel 12A, and therefore a liquid crystal image is displayed on the display surface of first transparent substrate 1.

Since scanning electrodes 5 and data electrodes 6 for reading are provided in the gap between the pixels, light traveling in the pixel portion will not be intercepted by scanning electrodes 5 or data electrodes 6. Therefore, sufficient display area of the display pixels can be assured, and a sufficiently high numerical aperture at the display surface can be maintained. As a result, excellent contrast of the display pixels can be maintained.

Figure 17A:
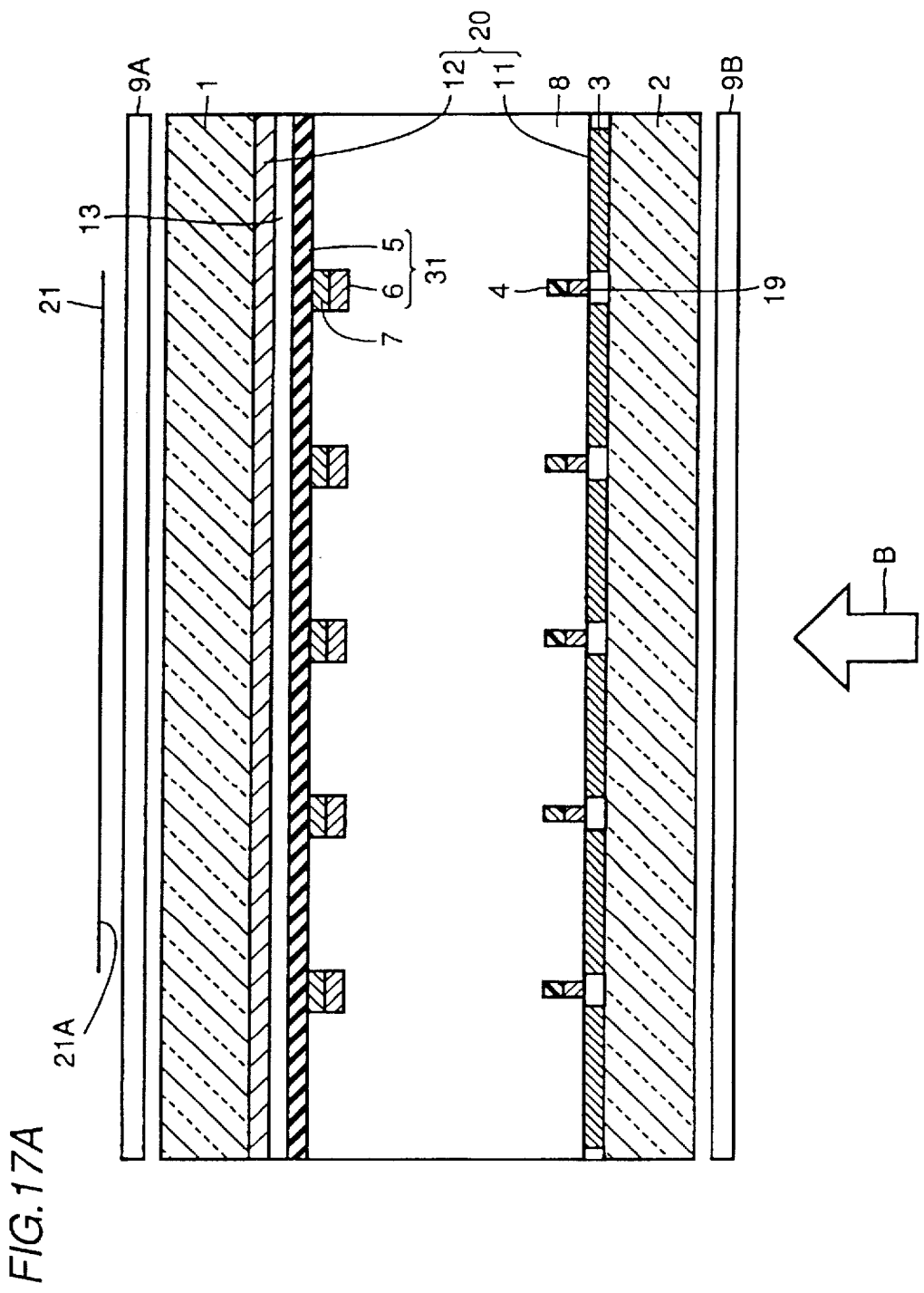

Referring to FIG. 17A, operation of the apparatus when the original 21 is reflective will now be described. In this case, the light source is located on the side opposite to first transparent substrate 1 with respect to second transparent substrate 2, and back light B from this light source is reflected at an image surface 21A of original 21. As in the first embodiment, back light B is intercepted only by opaque data electrodes 6. Therefore, a large amount of back light B can be radiated onto image surface 21A of original 21. In addition, light to be directly incident onto light receiving elements 7 out of back light B is intercepted by opaque data electrodes 6 and therefore back light B will not be directly incident onto light receiving elements 7.

Accordingly, the light receiving elements can receive only reflection light from the original image. As a result, excellent contrast of the read image can be maintained.

Figure 17B:
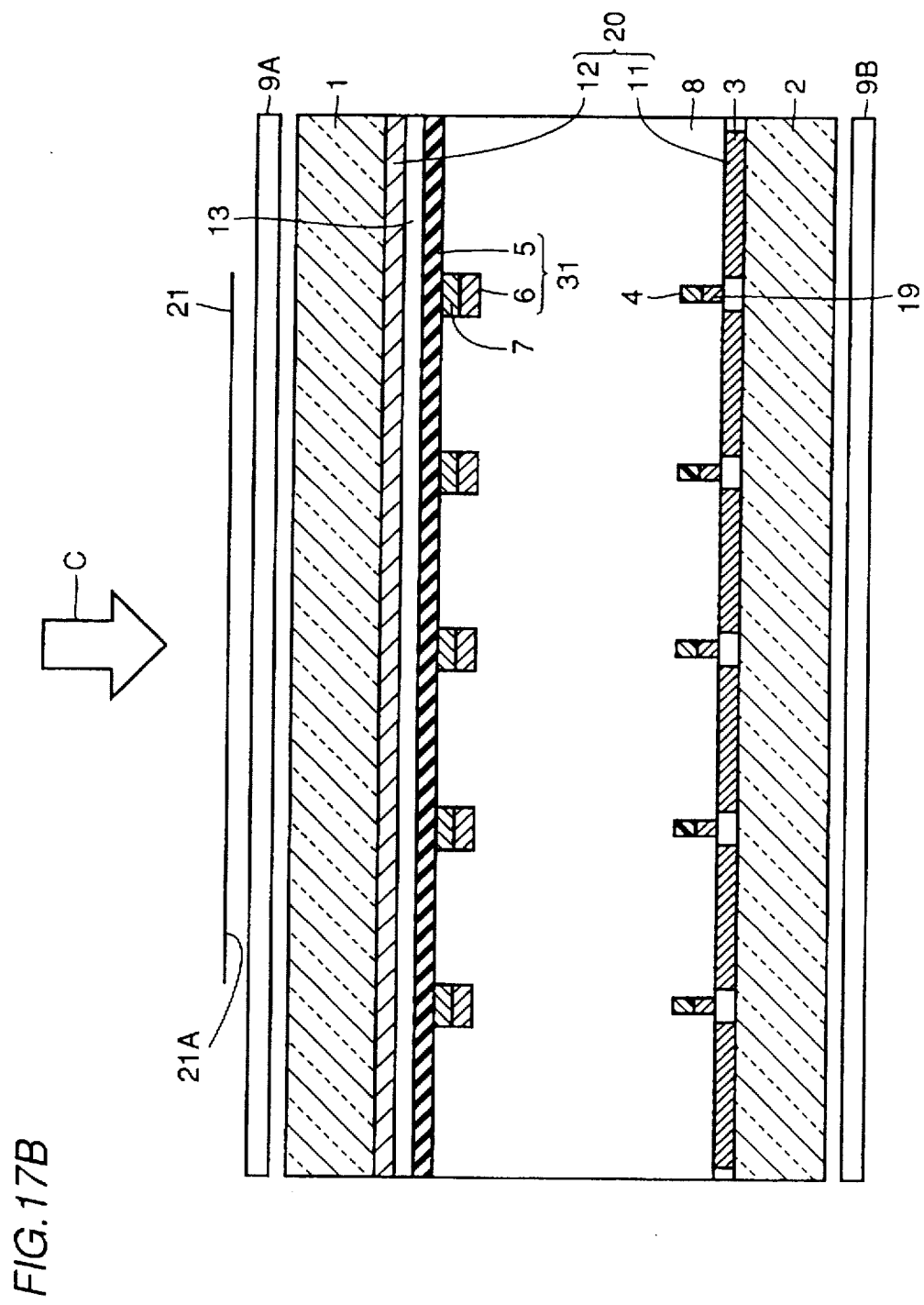

Referring to FIG. 17B, operation of the apparatus when the original 21 is transparent will now be described. Image surface 21A of original 21 to be read is attached to polarizing plate 9A on first transparent substrate 1. Light source C emits light from the outside of first transparent substrate 1 onto original 21. Light from image surface 21A is transmitted through first transparent substrate 1, common electrode 12 for display, insulating film 13, and first scanning electrodes 5 for reading to be incident onto light receiving elements 7. Charges stored in light receiving elements 7 are read with scanning electrodes 5 and data electrodes 6, whereby an image of surface 21A can be read. Since scanning electrodes 5 for reading are transparent, light to be incident from the side of original 21 onto light receiving elements 7 will not be intercepted, achieving reading of the image with high contrast. Note that specific reading operation is similar to that of the above-described first embodiment.

According to the liquid crystal image displaying/reading apparatus of the active matrix driving method of the second embodiment as described above, the light receiving elements, the data electrodes, and the scanning electrodes for reading an image can be located at the positions corresponding to the gap between the display pixels. Therefore, sufficient display area for the display pixels can be assured and a superior numerical aperture can be achieved. Consequently, excellent contrast of the display image can be maintained.

In addition, since the data electrodes for reading are opaque, light from the light source for reading can be prevented from being incident onto the light receiving elements. Furthermore, since the numerical aperture is high, a large amount of light can be used for reading. Therefore, image reading also can be carried out with high contrast.

In addition, the light receiving elements can be made to have an L-shape which achieves effective use of area between the display pixels. Therefore, reflection light from the original can be received as much as possible as far as the numerical aperture of the display screen is hardly reduced. Consequently, the original image can be read more accurately.

Furthermore, the electrodes for reading can be made to have a comb-shape which achieves effective use of area between the display pixels. Therefore, reflection light from the original can be received as much as possible as far as the numerical aperture of the display screen is hardly reduced. Consequently, the original image can be read more accurately.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal image displaying/reading apparatus, comprising:
   a first transparent substrate;
   a second transparent substrate formed in parallel with said first transparent substrate with a fixed space therebetween;
   a set of display electrodes formed on said first transparent substrate and said second transparent substrate so that a plurality of rectangular display pixels arranged in a matrix with a prescribed gap therebetween are formed at said first transparent substrate;
   a plurality of light receiving elements formed between said first transparent substrate and said second transparent substrate at a position facing said gap for receiving light to convert the light into current, each light receiving element having a substantially L-shape formed between a corresponding display pixel and two display pixels respectively adjacent to two orthogonal sides of said corresponding display pixel;
   reading means formed at a position facing said gap with said light receiving element interposed for reading a signal received by said light receiving element; and
   liquid crystal loaded between said first transparent substrate and said second transparent substrate, wherein said reading means includes a first transparent reading electrode formed on first a side of said light receiving element adjacent said transparent substrate, and a second opaque reading electrode formed on a second side of said light receiving element opposite said first side of said light receiving element.

2. The liquid crystal image displaying/reading apparatus according to claim 1, wherein
   said matrix has a plurality of rows and a plurality of columns, and
   said first reading electrode has a comb-shape continuously formed in a gap between a plurality of display pixels included in one row of said matrix and in a gap between said one row and one row adjacent thereto.

3. The liquid crystal image displaying/reading apparatus according to claim 2, wherein
   said second reading electrode has a comb-shape continuously formed in a gap between a plurality of display pixels included in one row of said matrix and in a gap between said one row and one row adjacent thereto.

4. The liquid crystal image displaying/reading apparatus according to claim 3, wherein
   said set of display electrodes include
   a first strip-shaped display electrode formed on a side of said first reading electrode of said first transparent substrate in a row direction of said matrix, and
   a second strip-shaped display electrode formed on a side of said second reading electrode of said second transparent substrate in a column direction of said matrix.

5. The liquid crystal image displaying/reading apparatus according to claim 3, wherein
   said set of display electrodes include
   a first display electrode formed on a side of said first reading electrode of said first transparent substrate so as to entirely cover said plurality of display pixels arranged in a matrix, and
   second display electrodes arranged in a matrix at positions corresponding to said plurality of display pixels on a side of said second reading electrode of said second transparent substrate.

6. The liquid crystal image displaying/reading apparatus according to claim 2, wherein
   said set of display electrodes include
   a first strip-shaped display electrode formed on a side of said first reading electrode of said first transparent substrate in a row direction of said matrix, and
   a second strip-shaped display electrode formed on a side of said second reading electrode of said second transparent substrate in a column direction of said matrix.

7. The liquid crystal image displaying/reading apparatus according to claim 2, wherein
   said set of display electrodes include
   a first display electrode formed on a side of said first reading electrode of said first transparent substrate so as to entirely cover said plurality of display pixels arranged in a matrix, and
   second display electrodes arranged in a matrix at positions corresponding to said plurality of display pixels on a side of said second reading electrode of said second transparent substrate.

8. The liquid crystal image displaying/reading apparatus according to claim 1, wherein
   said set of display electrodes include
   a first strip-shaped display electrode formed on a side of said first reading electrode of said first transparent substrate in a row direction of said matrix, and
   a second strip-shaped displaying electrode formed on a side of said second reading electrode of said second transparent substrate in a column direction of said matrix.

9. The liquid crystal image displaying/reading apparatus according to claim 1, wherein
   said set of display electrodes include
   a first display electrode formed on a side of said first reading electrode of said first transparent substrate so as to entirely cover said plurality of display pixels arranged in a matrix, and second display electrodes arranged in a matrix at positions corresponding to said plurality of display pixels on a side of said second reading electrode of said second transparent substrate.

10. A liquid crystal image displaying/reading apparatus comprising:

a first transparent substrate;

a second transparent substrate formed in parallel with said first transparent substrate with a fixed space therebetween;

a set of display electrodes formed on said first transparent substrate and said second transparent substrate so that a plurality of square display pixels arranged in a matrix with a prescribed gap therebetween are formed at said first transparent substrate;

a plurality of light receiving elements formed between said first transparent substrate and said second transparent substrate at a position facing said gap for receiving light to convert the light into current, each light receiving element having a substantially L-shape formed between a corresponding display pixel and two display pixels respectively adjacent to two orthogonal sides of said corresponding display pixel;

reading means formed at a position facing said gap with said light receiving element interposed for reading a signal received by said light receiving element; and liquid crystal loaded between said first transparent substrate and said second transparent substrate, wherein said reading means includes a first transparent reading electrode formed on first a side of said light receiving element adjacent said transparent substrate, and a second opaque reading electrode formed on a second side of said light receiving element opposite said first side of said light receiving element.

11. The liquid crystal image displaying/reading apparatus according to claim 10, wherein said matrix has a plurality of rows and a plurality of columns, and said first reading electrode has a comb-shape continuously formed in a gap between a plurality of display pixels included in one row of said matrix and in a gap between said one row and one row adjacent thereto.

12. The liquid crystal image displaying/reading apparatus according to claim 11, wherein said second reading electrode has a comb-shape continuously formed in a gap between a plurality of display pixels included in one row of said matrix and in a gap between said one row and one row adjacent thereto.

13. The liquid crystal image displaying/reading apparatus according to claim 12, wherein said set of display electrodes include a first strip-shaped display electrode formed on a side of said first reading electrode of said first transparent substrate in a row direction of said matrix, and a second strip-shaped display electrode formed on a side of said second reading electrode of said second transparent substrate in a column direction of said matrix.

14. The liquid crystal image displaying/reading apparatus according to claim 12, wherein said set of display electrodes include a first display electrode formed on a side of said first reading electrode of said first transparent substrate so as to entirely cover said plurality of display pixels arranged in a matrix, and second display electrodes arranged in a matrix at positions corresponding to said plurality of display pixels on a side of said second reading electrode of said second transparent substrate.

* * * * *